US007323532B2

(12) United States Patent
Fäcke et al.

(10) Patent No.: US 7,323,532 B2
(45) Date of Patent: *Jan. 29, 2008

(54) LOW-VISCOSITY RADIATION-CURING AND THERMALLY CURING POLYISOCYANATES

(75) Inventors: Thomas Fäcke, Bridgeville, PA (US);
Jan Weikard, Odenthal (DE);
Wolfgang Fischer, Meerbusch (DE)

(73) Assignee: Bayer MaterialScience AG, Leverkusen (DE)

( * ) Notice: Subject to any disclaimer, the term of this patent is extended or adjusted under 35 U.S.C. 154(b) by 42 days.

This patent is subject to a terminal disclaimer.

(21) Appl. No.: 10/674,263

(22) Filed: Sep. 29, 2003

(65) Prior Publication Data
US 2004/0068081 A1 Apr. 8, 2004

(30) Foreign Application Priority Data
Oct. 4, 2002 (DE) ................ 102 46 512

(51) Int. Cl.
C08G 18/81 (2006.01)
C08L 75/14 (2006.01)
C08L 75/16 (2006.01)
C09D 175/14 (2006.01)
C09D 175/16 (2006.01)
C09J 175/14 (2006.01)
C09J 175/16 (2006.01)
C07C 275/60 (2006.01)
C07C 273/00 (2006.01)
C07C 269/00 (2006.01)

(52) U.S. Cl. ............... 528/75; 252/182.18; 252/182.2; 252/182.21; 252/182.22; 428/422.8; 428/423.1; 428/425.1; 428/425.5; 428/425.8; 526/258; 526/260; 526/261; 526/263; 526/266; 526/301; 526/302; 528/59; 528/73; 540/202; 544/67; 544/222; 548/951; 548/952; 560/24; 560/25; 560/115; 560/157; 560/158; 560/330; 560/331; 560/332; 560/335; 560/336; 560/357; 564/32; 564/38; 564/44; 564/46; 522/97; 522/174

(58) Field of Classification Search ............ 428/422.8, 428/423.1, 425.1, 425.5, 425.8; 252/182.18, 252/182.2, 182.21, 182.22; 528/59, 73, 75; 526/258, 260, 261, 263, 266, 301, 302; 540/202; 544/67, 222; 548/951, 952; 564/44, 46, 564/32, 38; 560/24, 25, 115, 157, 158, 330, 560/331, 332, 335, 336, 357; 522/97, 174
See application file for complete search history.

(56) References Cited

U.S. PATENT DOCUMENTS

| 4,160,080 | A | | 7/1979 | Köenig et al. ................ 528/59 |
|---|---|---|---|---|
| 4,342,793 | A | | 8/1982 | Skinner et al. ............... 427/44 |
| 4,456,744 | A | * | 6/1984 | Kamatani et al. ............ 528/71 |
| 5,672,736 | A | | 9/1997 | Brahm et al. ............... 560/345 |
| 5,739,251 | A | | 4/1998 | Venham et al. ............... 528/49 |
| 5,767,220 | A | * | 6/1998 | Venham et al. ............... 528/49 |
| 5,777,024 | A | * | 7/1998 | Killilea et al. .............. 524/590 |
| 5,917,083 | A | | 6/1999 | König et al. ................ 560/157 |
| 5,951,911 | A | | 9/1999 | Venham et al. .......... 252/182.2 |
| 6,111,053 | A | * | 8/2000 | Brahm et al. ................. 528/75 |
| 6,191,181 | B1 | | 2/2001 | Weikard et al. ............ 522/17.4 |
| 6,392,001 | B1 | | 5/2002 | Mertes et al. ................ 528/59 |
| 6,555,596 | B1 | * | 4/2003 | Pourreau et al. ............ 522/152 |
| 6,617,413 | B1 | | 9/2003 | Bruchmann et al. ......... 528/75 |
| 6,747,088 | B1 | * | 6/2004 | Schwalm et al. ........... 524/507 |
| 6,780,951 | B2 | * | 8/2004 | Pourreau et al. ............ 526/301 |

FOREIGN PATENT DOCUMENTS

| CA | 2356685 | 7/2000 |
|---|---|---|
| DE | 167066 | 1/2006 |
| EP | 928 800 | 7/1999 |
| GB | 994 890 | 12/1962 |

OTHER PUBLICATIONS

Polyurethane Handbook Oertel, Editor, hanser Publishers, Munich 1994, pp. 12-15 "Principles of Polyurethane Chemistry and Special Applications".
Chemistry & Technology of UV & EB Formulations for Coatings, Inks & Paints, vol. 2, 1991, SITA Technology, London, pp. 237-285, N.S. Allen, M.A. Johnson, P.K.T. Olding, M. S. Salim, Reactive Diluents for UV and EB Curable Formulations.

* cited by examiner

*Primary Examiner*—Rabon Sergent
(74) *Attorney, Agent, or Firm*—Noland J. Cheung

(57) ABSTRACT

The present invention concerns a process for producing low-viscosity polyisocyanates or secondary products thereof, which carry activated, radiation-curable double bonds and can optionally also cure thermally, and low-viscosity polyisocyanate mixtures or secondary products thereof and their use in coating compounds.

16 Claims, No Drawings

LOW-VISCOSITY RADIATION-CURING AND THERMALLY CURING POLYISOCYANATES

CROSS REFERENCE TO RELATED PATENT APPLICATION

The present patent application claims the right of priority under 35 U.S.C. §119 (a)-(d) of German Patent Application No. 102 46 512.6, filed Oct. 4, 2002.

FIELD OF THE INVENTION

The present invention concerns a process for producing low-viscosity polyisocyanates or secondary products thereof, which carry activated, radiation-curable double bonds and can optionally also cure thermally, and low-viscosity polyisocyanate mixtures or secondary products thereof and their use in coating compounds.

BACKGROUND OF THE INVENTION

The curing of coating systems carrying activated double bonds by radiation, such as e.g. UV light, IR radiation or electron beam radiation, is known and technically established. It is one of the fastest curing methods in coating technology. Adhesion is often a problem, however. In addition, the curing of coatings that can be cured by electromagnetic radiation is dependent on an adequate radiation dose. In badly lit or unlit areas, this leads to significantly poorer curing or to no crosslinking at all.

Binders based on polyisocyanates and polyols are extremely suitable for producing high-quality coatings. The desired paint properties, such as e.g. adhesion, elasticity, chemical resistance, weathering resistance or scratch resistance, can be adjusted within broad limits by varying the feed materials.

Combining these two mutually independent curing mechanisms in one binder system allows their positive properties to be united. Such systems, known as "dual cure" systems, are known. For example, US patent U.S. Pat. No. 4,342,793 describes the use of coating systems compounded from a radiation-curable reactive thinner, e.g. acrylic acid esters, a polyol and a polyisocyanate. The problem here is that in unlit areas the radiation-curable reactive thinner is left behind as a plasticiser and thus has a negative influence on the film properties or can even leave the film, which can lead to undesirable physiological effects.

Also known are "dual cure" binders whose radiation-curable components are chemically bonded to the polyisocyanate, so that the described effects can be avoided. For example, European patent application EP-A 0 928 800 teaches the use of NCO-functional urethane acrylates containing isocyanurate groups as a component of a "dual cure" coating system. In order to be able to apply these coating compounds easily, adequately low viscosities are needed, so various organic solvents are used.

Due the ecological and economic requirements for modern paint systems to use as little organic solvent as possible, if any, to lower the viscosity, there is a desire to use low-viscosity paint resins. Polyisocyanates having an allophanate structure have long been known for this purpose, as described inter alia in European patent EP-A 0 682 012.

Allophanates have long been known in coating compounds (see also GB-PS 994 890, EP-A-0 000 194) and are produced in industry by reacting a monohydric or polyhydric alcohol with excess aliphatic or cycloaliphatic diisocyanate. Unreacted diisocyanate is then removed by distillation in vacuo. Mixed, aliphatic/aromatic "heteroallophanates" are also known from EP 0 712 840.

EP-A 0867457 describes the production of allophanate-containing, radiation-curing binders based on polyurethane. However, these binders have no remaining free NCO groups, have viscosities of over 10,000 mpa·s at 25° C. (example 6-8) and have no activated double bonds, only unreactive allyl ether groups (structure R—CH$_2$—CH=CH$_2$). Reactive thinners (low-molecular esters of acrylic acid), which introduce the necessary UV reactivity, must therefore be added. These substances cannot be used for a dual cure process.

Isocyanate-containing dual cure binders having an allophanate structure and activated double bonds are described in the German laid-open specification DE-A 198 60 041. The process uses the conventional formulation with excess diisocyanate, the undesirable, unreacted monomeric diisocyanates having to be removed again in a subsequent, necessary film distillation. This procedure has the major disadvantage, however, that a high thermal loading during distillation at 135° C. can be expected, such that the activated double bond in particular tends to polymerise under these conditions. Lower temperatures are not enough to minimise sufficiently the proportion of diisocyanate monomers, which cannot be tolerated for health and safety reasons. The process is thus virtually unfeasible on an industrial scale.

EP-A 0 825 211 describes a process for synthesising allophanate structures by reacting diisocyanatooxadiazinetriones with phenols, saturated, aliphatic or cycloaliphatic or araliphatic monoalcohols or polyalcohols. Basic compounds, typically those with a pKa value of greater than 7.5, are used as a catalyst for the reaction. Stabilisation of double bonds is not described.

The underlying object of the present invention is to provide urethane acrylates and dual cure binders having activated double bond(s) which during their production or aftertreatment only require temperatures of below 100° C. In addition, particularly where volatile organic solvents (VOC=volatile organic compounds) are minimised or avoided, the desired binders should have sufficiently low viscosities of below 10,000 mPas at room temperature.

SUMMARY OF THE INVENTION

The present invention is directed to a process for producing a polyisocyanate or a polyisocyanate secondary product containing at least one allophanate group, which carries at least one acrylate, methacrylate or vinyl ether double bond on the oxygen atom of the allophanate group, said oxygen atom being bound by two single bonds, comprising the step of reacting a polyisocyanate or a polyisocyanate secondary product containing at least one oxadiazinetrione group of formula 1

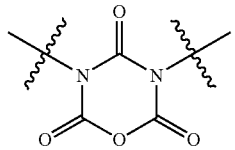

Formula 1 with an alcohol containing an acrylate, methacrylate or vinyl ether double bond at a temperatures of from −20 to 100° C.

The present invention is also directed to a polyisocyanate mixture or mixture of polyisocyanate secondary products containing a) a polyisocyanate or a polyisocyanate secondary product with at least one allophanate group, which carries at least one acrylate, methacrylate or vinyl ether double bond on the oxygen atom of the allophanate group, said oxygen atom being bound by two single bonds, and b) a polyisocyanate or a polyisocyanate secondary product with 0.1 to 10 wt. % uretdione groups relative to the total polyisocyanate mixture or mixture of polyisocyanate secondary products.

The present invention is further directed to compositions selected from coating compositions, adhesive compositions, curing composition systems, and sealing compositions that contain the compounds described above as well as substrates coated with such coating compositions.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

As used herein, the term "polyisocyanate secondary product" refers to nucleophilic addition products of isocyanates, which include, but are not limited to dimers (uretdiones), trimers (isocyanurates), urethanes (reaction with alcohol), ureas (reaction with amines), allophanates (reaction with isocyanates), and biurets (reaction of ureas with isocyanates). *Polyurethane Handbook*, Oertel, Editor, Hanser Publishers, Munich (1994) pp. 12-15.

As used herein, the term "activated double bond" refers to a double bond that is capable of undergoing a polymerization reaction when exposed a radiation source selected from ultra-violet light, infrared radiation and electron beam radiation.

It has now been found that low-viscosity isocyanate-functional dual cure binders are obtained from the reaction of oxadiazinetriones with alcohols containing an activated double bond. This was particularly surprising as EP-A 0 825 211 teaches that the conventional phenolic stabilisers from the acrylate groups should likewise react with oxadiazinetriones, so that an undesirable, premature polymerisation was to be expected and this synthesis pathway should therefore have been unusable.

The invention provides a process for producing a polyisocyanate or polyisocyanate secondary product containing at least one allophanate group, which carries at least one acrylate, methacrylate or vinyl ether double bond on the oxygen atom of the allophanate group, said oxygen atom being bound by two single bonds, characterised in that a polyisocyanate or polyisocyanate secondary product containing at least one oxadiazinetrione group (formula 1)

Formula 1

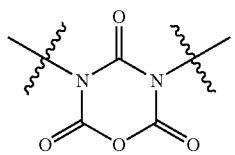

is reacted with an alcohol containing an acrylate, methacrylate or vinyl ether double bond at temperatures between −20 and 100° C.

Polyisocyanates or polyisocyanate secondary products that are obtainable by the process according to the invention, i.e. by reacting an oxadiazinetrione (formula 1) functional polyisocyanate or polyisocyanate secondary product with an alcohol containing an acrylate, methacrylate or vinyl ether double bond at temperatures between −20 and 100° C. and adding a basic catalyst as well as one or more stabilisers, can be described in more detail by formula 2.

Formula 2

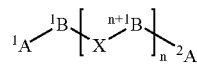

The placeholders in formula 2 are explained below.

$^1A$, $^2A$ stand for isocyanate or for the same or different structures of isocyanate secondary products containing iminooxadiazinedione, isocyanurate, uretdione, urethane, allophanate, biuret, urea or oxadiazinetrione structures and carrying the radicals $^1B$ to $^{n+1}B$ cited below in N position $^1B$ to $^{n+1}B$ are the same or different radicals produced by modelling the two isocyanate groups of an aliphatic, cycloaliphatic or araliphatic diisocyanate, X stands for one of the structures X-1 and/or X-2, and optionally small amounts of the same or different radicals of isocyanate secondary products containing iminooxadiazinedione, isocyanurate, uretdione, urethane, allophanate, biuret, urea or oxadiazinetrione structures Structure X-1

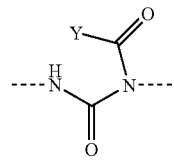

Structure X-2

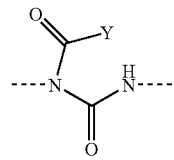

Y stands for an organic radical containing at least one activated double bond;

n is a number greater than one and less than 20 and represents the mean of all molecules having formula 2 present in the compound according to the invention.

The substructures $^1A$, and $^2A$ are isocyanate or the same or different structures of isocyanate secondary products having an iminooxadiazinedione, isocyanurate, uretdione, urethane, allophanate, biuret, urea or oxadiazinetrione structural type and carrying the radicals B cited below in N position. In an embodiment of the invention, $^1A$, and $^2A$ represent isocyanate groups, blocked isocyanate groups or urethane groups. Urethanes having an unsaturated radical Y and produced by reacting an H—Y molecule with an isocyanate group are preferred as urethane groups, with urethanes carrying the same radicals, such that $^1A$ equals $^2A$, being particularly preferred. In a further embodiment, $^1A$, and $^2A$ represent isocyanate groups, in this case $^1A=^2A$.

The substructures $^1B$ to $^{n+1}B$ are the radicals that are produced by modelling the two isocyanate groups of an aliphatic, cycloaliphatic or araliphatic diisocyanate and that can be incorporated into the binder by reacting an oxadiazinetrione based on one or more of these diisocyanates.

The contents of the functional groups in an embodiment of the products according to the process of the invention as meeasured by $^{13}$C—NMR-spectroscopy (see examples): are limited as follows:
2-35% allophanate (as contained in structures X-1 and X-2),
0.1-5% uretdione
0-5% oxadiazinetrione
0.1-25% urethane.

In an embodiment of the invention, the starting materials containing at least one oxadiazinetrione group for synthesis of the polyisocyanates or polyisocyanate secondary products according to the invention can be produced by reacting aliphatic, cycloaliphatic and/or araliphatic diisocyanates or polyisocyanates with carbon dioxide. Examples of aliphatic, cycloaliphatic and/or araliphatic diisocyanates that can be used in the invention include, but are not limited to ethylene diisocyanate, 1,4-diisocyanatobutane, 1,6-diisocyanatohexane, trimethyl hexane diisocyanate, 1,3- and 1,4-bis-isocyanatomethyl cyclohexane, isophorone diisocyanate, 4,4'-diisocyanatodicyclohexyl methane and the araliphatic diisocyanates 1,3- and 1,4-xylylene diisocyanates (XDI commercial product of Takeda, Japan) or mixtures thereof. In a particular embodiment of the invention, 1,6-Diisocyanatohexane is used.

In an embodiment of the invention, polyisocyanates containing at least one oxadiazinetrione group correspond to the general formula 5,

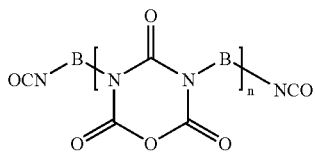

Structure 5 wherein in the oxadiazinetriones preferred here as educts for synthesis of the binders according to the invention, n in formula 5 corresponds to a number greater than 1 and less than 20 and molecules having different $n_i$ are generally present at the same time in one and the same polyisocyanate. Oxadiazinetriones having a mean value $$n = \frac{\sum_i n_i}{i},$$

which is less than 10, in some cases less than 5 and in other cases less than 3, are preferred.

Such polyisocyanates are commercially available (Baymicron Oxa WM06®, Bayer AG). Production is described in the German patent application DE 167066. In the production of oxadiazinetrione in accordance with this application, uretdione groups are produced in a content of 0.1 to 5 wt. %, depending on the reaction conditions.

In an embodiment of the invention, the secondary products containing at least one oxadiazinetrione group correspond to the general formula 6,

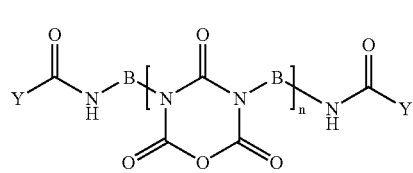

Structure 6

In a particular embodiment of the invention, the secondary products containing at least one oxadiazinetrione group are produced by reacting polyisocyanates containing at least one oxadiazinetrione group corresponding to the general formula 5 with H—Y compounds.

The substructure Y is a radical containing at least one double bond that is polymerisable by electromagnetic radiation and formed by modelling the proton from the isocyanate-reactive functional group of this radical. The term isocyanate-reactive functional group refers to alcohol (—OH), amine (NH) or thiol (SH) groups. In an embodiment of the invention the isocyanate-reactive functional groups include amine and alcohol groups, and in a particular embodiment they include alcohol groups. Double bonds that are polymerisable by electromagnetic radiation refer to vinyl, vinyl ether, propenyl, allyl, maleinyl, fumaryl, maleinimide, dicyclopentadienyl, acrylamide, acrylic and methacrylic groups. In an embodiment of the invention the polymerisable double bonds include vinyl ether, acrylic and methacrylic groups, and in a particular embodiment they include acrylic groups.

The allophanate group described in structure X-1 and X-2 and the urethane groups that are optionally contained in structures $^1A$, and $^2A$ are based on the substructure Y, and this on the alcohol that is typically used and that is derived intellectually from Y, whereby mixtures of different alcohols can also be used.

According to the invention the polyisocyanates or polyisocyanate secondary products containing at least one oxadiazinetrione group are reacted with these alcohols, for example.

In an embodiment of the invention, the alcohols include, but are not limited to 2-hydroxyethyl (meth)acrylate, polyethylene oxide mono(meth)acrylate (PEA6/PEM6; Laporte Performance Chemicals Ltd.), polypropylene oxide mono (meth)acrylate (PPA6, PPM5S; Laporte Performance Chemicals Ltd.), polyalkylene oxide mono(meth)acrylate (PEM63P, Laporte Performance Chemicals Ltd.), poly(ε-caprolactone) mono(meth)acrylates such as e.g. (Tone M100®; Union Carbide), 2-hydroxypropyl (meth)acrylate, 4-hydroxybutyl (meth)acrylate, 3-hydroxy-2,2-dimethyl propyl(meth)acrylate, the monoacrylates, diacrylates or tetraacrylates of polyhydric alcohols such as trimethylol propane, glycerine, pentaerythritol, dipentaerythritol, ethoxylated, propoxylated or alkoxylated trimethylol propane, glycerine, pentaerythritol, dipentaerythritol or technical mixtures thereof. In a particular embodiment, the alcohols include the acrylated monoalcohols such as glycerine di(meth)acrylate, trimethylol propane di(meth)acrylate, pentaerythritol tri(meth)acrylate, dipentaerythritol penta(meth) acrylate. Alcohols that can be obtained from the reaction of double bond-containing acids with epoxy compounds optionally containing double bonds, such as e.g. the reaction products of (meth)acrylic acid with glycidyl (meth)acrylate or bisphenol A diglycidyl ether, are also in accordance with the invention.

In addition to allophanate structures X-1 and X-2, the substructures X can optionally contain small amounts of other identical or different radicals of isocyanate secondary products containing iminooxadiazinedione, isocyanurate, uretdione, urethane, allophanate, biuret, urea or oxadiazinetrione structures. In an embodiment of the invention, structures of the urethane type, produced by reacting a dialcohol with isocyanate groups, are used. In a particular embodiment, ethylene glycol, diethylene glycol, triethylene glycol, tetraethylene glycol, dipropylene glycol, tripropylene glycol, short-chain polyethers based on ethylene oxide, propylene oxide or mixtures thereof, 1,2- and 1,3-propanediol, the isomeric butanediols, neopentyl glycol, 1,6-hexanediol, 2-ethyl-1,3-hexanediol, cyclohexane dimethanol, mono (meth)acrylates of trimethylol propane and ethane, of glycerine and epoxylated and propoxylated derivatives thereof or the technical mixtures obtainable by esterification of said alcohols with acrylic acid, 2-amino-ethanol and the isomeric aminopropanols, are used. Short-chain polyester diols such as e.g. ε-caprolactone, extended diols such as ethanediol, 1,2- and 1,3-propanediol, the isomeric butanediols, neopentyl glycol, 1,6-hexanediol, 2-ethyl-1,3-hexanediol, cyclohexane dimethanol are also used. In an embodiment of the invention, diols such as ethanediol, hexanediol, mono(meth) acrylates of trimethylol propane and glycerine are used and inj a particular embodiment ethanediol and hexanediol are used.

In the process according to the invention the oxadiazinetrione-containing polyisocyanate or polyisocyanate secondary products are set out, the temperature adjusted to −20 to 100° C., in some cases to 0 to 100° C., in other cases to 20 to 80° C. and in some situations to 40 to 60° C., and the necessary amount of stabiliser dissolved therein. After addition of the alcohol containing an activated double bond and of a suitable catalyst, carbon dioxide is spontaneously formed and escapes in gaseous form. Removal of the carbon dioxide from the reaction mixture can be accelerated by applying a vacuum of between 800 and 0 mbar or between 200 and 10 mbar or by introducing an inert gas such as air or nitrogen. In an embodiment of the invention, towards the end of the reaction a vacuum of 200 to 10 mbar is applied and maintained until the development of carbon dioxide can no longer be detected.

An inert solvent such as e.g. toluene, xylene, isooctane, acetone, butanone, methyl isobutyl ketone, ethyl acetate, butyl acetate, tetrahydrofuran, N-methyl pyrrolidone, dimethyl acetamide, dimethyl formamide can be used in the reaction, but in most embodiments of the invention, no solvent is added. Alternatively the reaction can also be performed in thinners which likewise (co)polymerise during UV curing. Such reactive thinners are described in P. K. T. Oldring (Ed.), Chemistry & Technology of UV & EB Formulations For Coatings, Inks & Paints, Vol. 2, 1991, SITA Technology, London, p. 237-285. As non-limiting examples, the esters of acrylic acid or methacrylic acid, typically the acrylic acid of the following alcohols, can be cited as examples. Monohydric alcohols are the isomeric butanols, pentanols, hexanols, heptanols, octanols, nonanols and decanols, also cycloaliphatic alcohols such as isobomol, cyclohexanol and alkylated cyclohexanols, dicyclopentanol, aryl aliphatic alcohols such as phenoxy ethanol and nonyl phenyl ethanol, and tetrahydrofurfuryl alcohols. Alkoxylated derivatives of these alcohols can also be used. Dihydric alcohols are for example alcohols such as ethylene glycol, propanediol-1,2, propanediol-1,3, diethylene glycol, dipropylene glycol, the isomeric butanediols, neopentyl glycol, hexanediol-1,6,2-ethyl hexanediol and tripropylene glycol or also alkoxylated derivatives of these alcohols. In an embodiment of the invention, dihydric alcohols, such as hexanediol-1,6, dipropylene glycol and tripropylene glycol are used. Trihydric alcohols are glycerine or trimethylol propane or alkoxylated derivatives thereof. Tetrahydric alcohols are pentaerythritol or alkoxylated derivatives thereof. In an embodiment of the invention, the alcohols have a low hydroxyl content of below 20 mg/g KOH.

Radiation-curing binders with e.g. acrylate groups must be protected against spontaneous polymerisation. Phenolic stabilisers, which inhibit polymerisation, are therefore added. Other stabilisers however, such as e.g. the class of HALS stabilisers (HALS=hindered amine light stabilisers), as is known to the person skilled in the art, have the disadvantage of not permitting such effective stabilisation. Instead a "creeping" radical polymerisation then occurs.

It can be useful also to add another stabiliser, a non-limiting example being a non-phenolic stabiliser, before applying the vacuum. In addition, volatile catalysts are also partially or completely removed from the reaction mixture during this procedure. Finally, another phenolic stabiliser is generally added for long-term stability and the reaction product optionally saturated with air.

Generally suitable catalysts are compounds having a pKa>7.5. Different catalysts are more suited to each double bond-containing alcohol that is used. In particular, the reaction conversion at the oxadiazinetrione ring and the tendency of the batch to polymerise are strongly influenced by the choice of catalyst and the amount of catalyst. Above all, the tendency of common stabilisers to react even with the oxadiazinetrione ring or the isocyanate groups plays a critical role here. The catalysts are advantageously used in a quantity of between 0.001 and 5.0 wt. %, in some cases 0.01 and 2.0 wt. % and in other cases 0.05 and 0.5 wt. %.

Suitable catalysts are tertiary amines such as trimethylamine, triethylamine, tributylamine, bis-isopropyl ethylamine, N,N-dimethyl benzylamine, 1,5-diazabicyclo[4.3.0] non-5-ene (DBN), 1,8-diazabicyclo[5.4.0]undec-7-one (DBU), tetramethyl butane diamine, tetramethyl propane diamine, dimethyl aminoaryl compounds such as dimethyl aminobenzene, dimethyl aminopyridine; alkali and alkaline-earth salts of carbonic acid, formic acid, acetic acid, propionic acid, benzoic acid and substituted benzoic acids and alcoholates of aliphatic and aromatic hydroxyl compounds such as sodium phenolate and sodium methylate. Cyclic aliphatic and cyclic aromatic nitrogen compounds are also used, such as $C_1$-$C_4$ N-alkyl pyrroles, pyrrolines, pyrrolidines, pyrazoles, imidazoles, imidazolines, imidazolidines, the isomeric triazoles, the optionally alkylated pyrimidines, pyridazines, the isomeric triazines, quinolines, isoquinolines, quinoxalines and acridines. In an embodiment of the invention, the catalysts are tertiary amines such as trimethylamine, triethylamine, tributylamine, bis-isopropyl ethylamine, N,N-dimethyl benzylamine, 1,5-diazabicyclo[4.3.0] non-5-ene (DBN), 1,8-diazabicyclo[5.4.0]undec-7-one (DBU), and in a particular embodiment the catalysts are triethylamine, bis-isopropyl ethylamine, and 1,8-diazabicyclo [5.4.0]undec-7-one (DBU).

The polyisocyanate compounds according to the invention must be stabilised against premature polymerisation. Phenols such as para-methoxy phenol, 2,5-di-tert.-butyl hydroquinone or 2,6-di-tert.-butyl-4-methyl phenol are used to this end. N-oxyl compounds are also suitable for stabilisation, such as e.g. 2,2,6,6-tetra-methyl piperidine-N-oxide (TEMPO) or one of its derivatives. The stabilisers can also be incorporated chemically into the binder; compounds from the aforementioned classes are suitable for this, particularly if they also carry other free aliphatic alcohol groups or primary or secondary amine groups and thus constitute stabilisers that are chemically bonded via urethane or urea groups. 2,2,6,6-tetra-methyl-4-hydroxy piperidine-N-oxide is particularly suitable for this. Other free-radical scavengers such as e.g. phenothiazine are also used.

Following the process according to the invention, other reactions conventionally used in polyurethane chemistry can be performed to further modify the products. Free isocyanate groups can be blocked by common blocking agents. This is particularly useful if the reaction temperature of the NCO/OH reaction is to be changed in order to extend the pot life, in other words the maximum processing time before crosslinking, of a fully formulated system. Possible blocking agents are ε-caprolactam, methyl ethyl ketone oxime, 3,5-dimethylpyrazole, diisopropyl-amine, diethyl malonate, imidazole, diethylamine, acetoacetic ester.

It is also possible, if the products according to the invention still contain isocyanate group, to react this with isocyanate-reactive compounds. In an embodiment of the invention, the isocyanate-reactive compounds are for example a diol, diamine or an amino alcohol, which can also contain other activated double bonds. Thus ethylene glycol, diethylene glycol, triethylene glycol, tetraethylene glycol, dipropylene glycol, tripropylene glycol, short-chain polyethers based on ethylene oxide, propylene oxide or mixtures thereof, 1,2- and 1,3-propanediol, the isomeric butanediols, neopentyl glycol, 1,6-hexanediol, 2-ethyl-1,3-hexanediol, cyclohexane dimethanol, mono(meth)acrylates of trimethylol propane and ethane, of glycerine and epoxylated and propoxylated derivatives thereof or the technical mixtures obtainable by esterification of said alcohols with acrylic acid, 2-amino-ethanol and the isomeric aminopropanols can be used. Short-chain polyester diols such as e.g. ε-caprolactone, extended diols such as ethanediol, 1,2- and 1,3-propanediol, the isomeric butanediols, neopentyl glycol, 1,6-hexanediol, 2-ethyl-1,3-hexanediol, cyclohexane dimethanol are also used. In an embodiment of the invention, diols such as ethanediol, hexanediol, monomethacrylates of trimethylol propane and glycerine are used. In a particular embodiment, ethanediol and hexanediol are used.

The invention also concerns coating, adhesive and curing composition systems, which can contain the following components:
1.) the polyisocyanate or polyisocyanate secondary product according to the invention
2.) optionally one or more additional polyisocyanates, which optionally contain activated double bonds
3.) optionally one or more initiators of radical polymerisation, which can be activated by heat or by high-energy radiation,
4.) optionally one or more isocyanate-reactive compounds, which optionally contain activated double bonds,
5.) optionally a UV absorber and/or a HALS stabiliser to improve weathering resistance,
6.) optionally conventional paint additives such as flow control and venting agents,
7.) optionally catalysts to accelerate the thermal crosslinking reaction,
8.) optionally solvents and
9.) optionally reactive thinners.

In an embodiment of the invention, the polyisocyanates mentioned under 2.) are based on hexamethylene diisocyanate, isophorone diisocyanate, and trimethyl hexamethylene diisocyanate. In a particular embodiment, the polyisocyanates have isocyanurate, allophanate, biuret, uretdione and/or iminooxadiazinetrione structures.

Initiators that can be activated by radiation and/or by heat can be used as initiators 3.) for radical polymerisation. Photoinitiators, which are activated by UV or by visible light, are typically used. Photoinitiators are commercial compounds known per se, a distinction being made between unimolecular (type I) and bimolecular (type II) initiators. Suitable (type I) systems are aromatic ketone compounds, e.g. benzophenones in combination with tertiary amines, alkyl benzophenones, 4,4'-bis-(dimethylamino)benzophenone (Michler's ketone), anthrone and halogenated benzophenones or mixtures of the cited types. Also suitable are (type II) initiators such as benzoin and derivatives thereof, benzil ketals, acyl phosphine oxides, e.g. 2,4,6-trimethyl benzoyl diphenyl phosphine oxide, bisacyl phosphine oxides, phenyl glyoxylic acid ester, camphor quinone, α-aminoalkyl phenones, α,α-dialkoxyacetophenones and α-hydroxyalkyl phenones.

The photoinitiators, which are used in quantities of between 0.1 and 10 wt. %, in some cases 0.1 to 5 wt. %, relative to the weight of the paint resin, can be used as an individual substance or also, because of frequent advantageous synergistic effects, in combination with one another.

If electron beams are used instead of UV radiation, no photoinitiator is required. As is known to the person skilled in the art, electron beam radiation is generated by thermal emission and accelerated by means of a potential difference. The high-energy electrons are then driven through a titanium film and are guided to the binders to be cured. The general principles of electron beam curing are described in detail in "Chemistry & Technology of UV & EB Formulations For Coatings, Inks & Paints", vol. 1, P K T Oldring (Ed.), SITA Technology, London, England, p. 101-157, 1991.

In the case of thermal curing of the activated double bonds, this can also take place with addition of thermally decomposing radical formers. Suitable examples, as is known to the person skilled in the art, are peroxy compounds such as dialkoxy dicarbonates, such as e.g. bis-(4-tert-butyl cyclohexyl) peroxy dicarbonate, dialkyl peroxides such as e.g. dilauryl peroxide, peroxy esters of aromatic or aliphatic acids such as e.g. tert.-butyl perbenzoate or tert.-amyl peroxy-2-ethyl hexanoate, inorganic peroxides such as e.g. ammonium peroxodisulfate, potassium peroxodisulfate, organic peroxides such as e.g. 2,2-bis-(tert.-butyl peroxy)butane, dicumyl peroxide, tert.-butyl hydroperoxide or also azo compounds such as 2,2'-azobis[N-(2-propenyl)-2-methyl propionamides], 1-[(cyano-1-methyl ethyl)azo] formamides, 2,2'-azobis(N-butyl-2-methyl propionamides), 2,2'-azobis(N-cyclohexyl-2-methyl propionamides), 2,2'-azobis {2-methyl-N-[2-(1-hydroxybutyl)] propionamides}, 2,2'-azobis {2-methyl-N-[2-(1-hydroxybutyl)] propionamides, 2,2'-azobis{2-methyl-N-[1,1-bis(hydroxymethyl)-2-hydroxyethyl] propionamides. Highly substituted 1,2-diphenyl ethanes (benzopinacols) are also suitable, such as e.g. 3,4-dimethyl-3,4-diphenyl hexane, 1,1,2,2-tetraphenyl ethanediol-1,2 or also silylated derivatives thereof.

A combination of initiators that can be activated by UV light and by heat can also be used.

The isocyanate-reactive compounds in 4.) are polyols, for example. They can be obtained from diols, triols and tetrols with di-acids, tri-acids and also unsaturated acids such as maleic acid (anhydride) (polyester polyols). In order to increase the necessary double bond density, esterification products of low-molecular polyols can also be used, such as e.g. pentaerythritol triacrylate or polyester acrylates such as e.g. Laromer® PE 44F from BASF AG, Germany. Polyols can also be obtained from the radical copolymerisation of monomers such as aliphatic esters of acrylic or methacrylic acid, styrene, acrylonitrile with hydroxy-functional monomers such as hydroxy alkyl (meth)acrylates (polyacrylate polyols). If glycidyl esters of (meth)acrylic acid are used, the polyacrylate polyols obtained, which are advantageously also radiation-curing, can also subsequently be modified with (meth)acrylic acid. Alkoxylation products of diols and polyols (polyether polyols) and sterically hindered amines, such as are produced by the addition of maleic acid esters to cycloaliphatic, primary amines (aspartic acid esters) are also suitable. Polyesters of carbonic acid are also used (polycarbonates).

The UV absorbers and HALS stabilisers mentioned in 5.) are suitable for increasing the weathering resistance of the cured paint film. The former should have an absorption range of a maximum of 390 nm, such as triphenyl triazine types (e.g. Tinuvin 400 (commercial product from Ciba)) or oxalic acid dianilides (e.g. Sanduvor 3206 (commercial product from Clariant)) and are added in a quantity of 0.5 to 3.5%, relative to solid resin. Suitable HALS stabilisers are commercially obtainable (Tinuvin 292 or Tinuvin 123 (both commercial products from Ciba) or Sanduvor 3258 (commercial product from Clariant)). In an embodiment of the invention, the UV absorbers and HALS stabilisers are used in amounts of 0.5 to 2.5% relative to solid resin.

The conventional flow control and venting additives mentioned in 6.) are generally based on polyacrylates and polysiloxanes.

The catalysts mentioned in 7.) are e.g. tin and/or zinc salts or organotin compounds, tin and/or zinc soaps such as e.g. tin octoate, dibutyl tin dilaurate, dibutyl tin oxide or tertiary amines such as e.g. diazabicyclo[2,2,2]octane (DABCO).

The solvents mentioned in 8.) are those that are not reactive to isocyanates and activated double bonds. Esters, ketones, ethers, ether esters, alkanes or aromatic solvents such as xylene or toluene are used, for example.

The reactive thinners mentioned in 9.) are thinners that likewise (co)polymerise under UV curing. Such reactive thinners are described in P. K. T. Oldring (Ed.), Chemistry & Technology of UV & EB Formulations For Coatings, Inks & Paints, vol. 2, 1991, SITA Technology, London, p. 237-285. The esters of acrylic acid or methacrylic acid, typically the acrylic acid of the following alcohols, can be cited as examples. Monohydric alcohols are the isomeric butanols, pentanols, hexanols, heptanols, octanols, nonanols and decanols, also cycloaliphatic alcohols such as isobornol, cyclohexanol and alkylated cyclohexanols, dicyclopentanol, aryl aliphatic alcohols such as phenoxy ethanol and nonyl phenyl ethanol, and tetrahydrofurfiryl alcohols. Alkoxylated derivatives of these alcohols can also be used. Dihydric alcohols are for example alcohols such as ethylene glycol, propanediol-1,2, propanediol-1,3, diethylene glycol, dipropylene glycol, the isomeric butanediols, neopentyl glycol, hexanediol-1,6,2-ethyl hexanediol and tripropylene glycol or also alkoxylated derivatives of these alcohols. In an embodiment of the invention, the dihydric alcohols are hexanediol-1,6, dipropylene glycol and tripropylene glycol. Trihydric alcohols are glycerine or trimethylol propane or alkoxylated derivatives thereof. Tetrahydric alcohols are pentaerythritol or alkoxylated derivatives thereof.

If all constituents of the coating system according to the invention are formulated as one component and free isocyanate groups are still present, the system has a limited pot life. In an embodiment of the invention, the formulation form is a two-component system, component 1 containing constituents 1.) and optionally 2.), component 2 containing constituent 4.). If required, the other components can be incorporated into component 1 or 2 or even into both. The particular components then have the storage stability of the individual constituents. Before application the components are then mixed in the stated ratio or applied by means of so-called two-component plants.

Application of the coating compound onto the material to be coated is performed using the conventional methods known in paint technology, such as atomisation, knife application, rolling, casting, dip coating, centrifugal casting, brushing or spraying.

Curing can be performed by a simultaneous and/or phased sequence of the process steps described below:

Optionally by allowing the solvents to evaporate. This takes place at room temperature, optionally at elevated temperature, typically at 60 to 90° C.

If photoinitiators in 3.) are used, radiation curing is can be performed under the action of high-energy radiation, in other words UV radiation or daylight, e.g. light of wavelength 200 to 700 nm, or by irradiation with high-energy electrons (electron beam radiation, 150 to 300 keV). Examples of radiation sources that can be used for light or UV light are high-pressure or medium-pressure mercury vapour lamps, wherein the mercury vapour can be modified by doping with other elements such as gallium or iron. Lasers, pulsed lasers (known as UV flash radiators), halogen bulbs or eximer radiators are also possible. The radiators can be fitted with filters, which prevent the emission of part of the emitted radiator spectrum. For example, for health and safety reasons the radiation assigned to e.g. UV-C or UV-C and UV-B can be filtered out. The radiators can be installed in a fixed location, such that the item to be irradiated is moved past the radiation source with a mechanical device, or the radiator can be movable and the item to be irradiated does not change position during curing. The conventionally adequate radiation dose for crosslinking with UV curing is in the range from 80 to 5000 mJ/cm$^2$.

Irradiation can optionally also be performed with exclusion of oxygen, e.g. under an inert gas atmosphere or oxygen-reduced atmosphere. In an embodiment of the invention, inert gases include nitrogen, carbon dioxide, noble gases or combustion gases. In addition, irradiation can be performed by covering the coating with media that are transparent for radiation. Examples of these are plastic films, glass or liquids such as water.

Depending on the radiation dose and curing conditions, the type and concentration of the initiator that is optionally used can be varied in the manner known to the person skilled in the art.

In an embodiment of the invention, high-pressure mercury radiators in fixed installations are used for curing. Photoinitiators are then used in concentrations of 0.1 to 10 wt. %, particularly preferably 0.2 to 3.0 wt. %, relative to the solids in the coating. A dose of 200 to 3000 mJ/cm$^2$, measured in the wavelength range from 200 to 600 nm, is typically used to cure these coatings.

By increasing the temperature if initiators in 3.) that can be activated by heat are used.

By crosslinking the NCO-containing constituents with the constituents that are reactive with NCO-containing constituents. This can take place at room temperature or at elevated temperature, advantageously up to 150° C. The compounds cited in 7.) are suitable as catalysts. In an embodiment of the invention, the curing process, reaction of the NCO-containing constituents proceeds in part during UV curing (irradiation) by means of elevated temperature or a longer UV radiation time if the temperature is left unchanged. IR radiation can also be used instead of or in combination with an elevated temperature.

A dual cure system can advantageously be used if (pre) crosslinking is performed initially by means of a first process step, which can include radiation-induced polymerisation, and post-crosslinking is carried out by means of a second process step (e.g. NCO—OH reaction). Between these two steps the coating has sufficient stability to be stored temporarily and e.g. to be shaped. A final curing and the desired stability is then obtained in the second step.

The binders according to the invention can also be used as adhesives and sealing compositions. The requirement for this usage in the case of UV radiation curing is that at least one of the two substrates to be glued or sealed together must be able to transmit UV radiation, in other words it must as a rule be transparent. In the case of electron beam radiation, adequate transmittance for electrons must be ascertained.

Suitable substrates consist of wood, metal, plastic, mineral substances and/or precoated substrates or mixtures of these substrates.

The binders according to the invention are also suitable as curing compositions in thermoforming, injection moulding and pressure diecasting processes. Here an object to be coated is introduced into a mould, leaving a maximum gap of 1 cm, in some cases less than 0.3 cm, between the surface of the object and the mould. The binder according to the invention is then pressed into the mould by means of an extruder and then cured thermally and/or by radiation.

The invention is further illustrated but is not intended to be limited by the following examples in which all parts and percentages are by weight unless otherwise specified.

EXAMPLES

The NCO contents were determined by wet analysis.

In order to determine the content of uretdione, allophanate, urethane and oxadiazinetrione groups, a 100 MHz $^{13}$C-NMR spectrum was measured in CDCl$_3$ with a relaxation delay of 4s, 2000 scans, an acquisition time of 1.03 seconds and an excitation angle of 30° C. All signals in the carbonyl range and the NCO signal were then integrated and allocated to the various structural groups: NCO $\delta(^{13}C)$= 121.4; oxadiazinetrione $\delta$ ($^{13}C$)=143.9 (2C) and $\delta$ ($^{13}C$)= 147.8 (1C); allophanate $\delta$ ($^{13}C$)=153.8 (1C), 155.7 (1C), urethane $\delta$ ($^{13}C$)=156.3 (1C), uretdione $\delta$ ($^{13}C$)=157.1 (2C). The molar ratios of the substructures were determined from the integrals and extrapolated to a percentage by weight. Each substructure was allocated its corresponding molecular weight in the process. In order to calculate the percentages by weight, the residual group weights are also required. (NCO: 42 g/mol (residue 42 g/mol=3 CH$_2$), oxadiazinetrione: 128 g/mol (residue 84 g/mol=6 CH$_2$), allophanate: 101 g/mol (residue 183 g/mol=6 CH$_2$+CH$_2$CH$_2$—OCO—CH=CH$_2$ in the case of hydroxyethyl acrylate), urethane: 59 g/mol (residue 141 g/mol=3 CH$_2$+CH$_2$CH$_2$—OCO—CH=CH$_2$ in the case of hydroxyethyl acrylate), uretdione 84 g/mol (residue 84 g/mol=6 CH$_2$).

Examples according to the invention:

In the examples below, all percentages relate to weight.

Example 1

69.54 g Baymicron Oxa WM 06 (commercial product from Bayer AG) and 0.1 g 2,6-di-tert.-butyl-4-methyl phenol are placed in a three-neck flask with reflux condenser and stirrer at 50° C. and 0.1 g triethylamine, 30.08 g 2-hydroxyethyl acrylate and 0.1 g 2,6-di-tert.-butyl-4-methyl phenol are added dropwise within 20 minutes. The reaction mixture is stirred at 50° C. for approximately 3 h, first under normal pressure and then, as soon as the evolution of gas reduces (approximately 2 h), under vacuum (approximately 25 mbar) until no more gas is evolved. 0.1 g 2,6-di-tert.-butyl-4-methyl phenol are then added and dissolved for 30 minutes at 50° C. Saturation with air (4 l/h) then follows for 20 minutes. A product is obtained with a viscosity of 1185 mPas/23° C. NCO content 10.9%, oxadiazinetrione content=1.3%, allophanate content 19.2%, urethane content 6.5%, uretdione content 1.0%.

Example 2

52.86 g Baymicron Oxa WM 06 and 0.1 g 2,6-di-tert.-butyl-4-methyl phenol are placed in a three-neck flask with reflux condenser, stirrer and gas inlet at 60° C. and air is passed through (¼ flask volume per hour). 0.1 g 2,6-di-tert.-butyl-4-methyl phenol and 46.74 g 2-hydroxyethyl acrylate are then added dropwise within 5 minutes (60° C. maintained) and stirred for a further 1 h. The reaction mixture is cooled to 50° C. and 0.1 g triethylamine added (evolution of gas, do not interrupt the introduction of air). As soon as the evolution of gas reduces (approximately 4 h), stirring is continued under vacuum (approximately 20 mbar) for approximately a further 2.5 h until no more gas is evolved. 0.1 g 2,6-di-tert.-butyl-4-methyl phenol are then added and dissolved for 30 minutes at 50° C. A product is obtained with a viscosity of 8215 mPas/23° C. NCO content 0.7%, oxadiazinetrione content=0.0%, allophanate content 14.7%, urethane content 15.6%, uretdione content 0.5%.

Example 3

1000 g Desmodur H (commercial product from Bayer AG) are placed in a three-neck flask with a jacketed coil condenser and stirrer at room temperature and saturated with CO$_2$ for 2.5 hours. The mixture is heated to 45° C. with further introduction of CO$_2$, 1 g tri-n-butyl phosphine is added quickly and the mixture heated to 60° C. The NCO content is monitored. At NCO<30% (approximately 19 h), 2.76 g toluene sulfonic acid methyl ester are added and stirring is continued for a further 2 h at 80° C. The crude product from 1065 g (NCO=28.9%) is freed from monomeric HDI in a falling film vaporiser (preliminary and main vaporiser 120° C./0.2 mbar). Yield 641 g (NCO=16.8).

Example 4

0.1 g 2,6-di-tert.-butyl-4-methyl phenol and 67.87 g of the product from Example 3 are placed in a three-neck flask with reflux condenser and stirrer at 50° C. and 0.1 g 2,6-di-tert.-butyl-4-methyl phenol, 0.08 g triethylamine and 31.49 g 2-hydroxy-ethyl acrylate are added dropwise within 20 minutes in such a way that the temperature of 50° C. is maintained. The reaction mixture is stirred at 50° C., first under normal pressure and then, as soon as the evolution of gas reduces (approximately 2 h), 0.1 g 2,6-di-tert.-butyl-4-methyl phenol and 0.001 g 2,2,6,6-tetramethyl piperidine-1-oxyl are added and stirring is continued under vacuum (approximately 25 mbar) for approximately a further 3.5 h until no more gas is evolved. 0.1 g 2,6-di-tert.-butyl-4- methyl phenol and 0.16 g dibutyl phosphate are then added and dissolved for 30 minutes at 50° C. A product is obtained with a viscosity of 5695 mPas/23° C. NCO content 7.7%, oxadiazinetrione content=2.58%, allophanate content 19.7%, urethane content 7.2%, uretdione content 1.0%.

Example 5

421.67 g 2-hydroxyethyl acrylate and 0.9 g dibutyl tin oxide are placed in a three-neck flask with reflux condenser and stirrer and heated to 110° C. 1077.43 g ε-caprolactone are then added within 1 h and stirring is continued for a further 19 h at 110° C. A monoalcohol is obtained with a hydroxyl value of 136.

Example 6

778.61 g Baymicron Oxa WM 06 and 2.03 g 2,6-di-tert.-butyl-4-methyl phenol are placed in a three-neck flask with reflux condenser, stirrer and gas entry tube at 60° C. When the 2,6-di-tert.-butyl-4-methyl phenol is dissolved, air is introduced (2 l/h). After 40 minutes, 2.03 g 2,6-di-tert.-butyl-4-methyl phenol, 10.15 g 1,8-diazabicyclo[5.4.0]undec-7-one and 1205.15 g of the product from Example 5 are added. The reaction mixture begins to foam and is stirred for 3 h at 50° C. 0.04 g 2,2,6,6-tetramethyl-4-hydroxypiperidine-1-oxyl are then added and a vacuum (20 mbar) applied. When the evolution of gas has finished, the vacuum is broken and 0.1 g 2,6-di-tert.-butyl-4-methyl phenol are introduced by dissolution (30 min) and air continues to be introduced. A product is obtained with a viscosity of 5000 mPas/23° C. NCO content 4.9%, oxadiazinetrione content=0.7%, allophanate content 11.2%, urethane content 3.0%, uretdione content 0.5%.

Example 7

491.91 g of the product from Example 1, 7.84 g ethanediol and 0.25 g dibutyl tin dilaurate are placed in a three-neck flask with reflux condenser and stirrer and stirred for 3 h at 50° C. A product is obtained with a viscosity of 5680 mpas/23° C. NCO content 8.1%, oxadiazinetrione content=1.07%, allophanate content 17.63%, urethane content 9.04%, uretdione content 0.91%.

Example 8

3600 g butyl acetate are placed in a pressure vessel reactor and heated to 165° C. (approximately 2.3 bar). A solution of 2772.0 g glycidyl methacrylate, 3207.6 g methyl methacrylate and 1663.2 g n-butyl acrylate is then metered in within 3 h. At the same time a solution of 277.2 g Peroxan DB (di-tert.-butyl peroxide, commercial product from Pergan GmbH) and 480 g butyl acetate is metered in for 3.5 h. Stirring is continued for a further hour and the mixture is then cooled to 40° C. The mixture is removed via a T5500 filter and introduced into containers.

Example 9

3567.88 g of the product from Example 8, 417.78 g acrylic acid, 2.75 g triethyl benzyl ammonium chloride, 2.75 g 2,6-di-tert.-butyl-4-methyl phenol, 0.56 g 2,5-di-tert.-butyl hydroquinone and 8.17 g p-methoxyphenol are placed in a three-neck flask with reflux condenser, stirrer and gas entry tube and heated to 90° C. with introduction of air. The mixture is cooled after 120 h. A product is obtained with a viscosity of 735 mPas/23° C.

Application Examples

The products were mixed with the polyol in a molar ratio of NCO:OH of 1:1 and 5% Irgacure 184 (commercial product from Ciba) was added. A metal plate was then coated with a hand coater (film thickness approx. 60 μm). Following an evaporation phase of 5 minutes at 60° C., curing was performed with UV light (conveyor unit, 1 radiator, high-pressure mercury radiator 80 W/cm lamp length [CK radiator, commercial product from IST, Metzingen, DE], irradiation performed twice at a belt speed of 5 m/min). The chemical resistance was then determined with 200 double acetone strokes. To this end a wad of cotton wool soaked in acetone was moved to and fro over the surfaces 200 times with a force of approximately one kilo. The result was assessed visually. The result was recorded in the form of grades (0=unchanged to 5=destroyed). The pendulum hardness was also determined. These tests were repeated after thermal post-curing (30 min. 120° C.).

| Example | Catalyst | Polyol | Irgacure 184 |
| --- | --- | --- | --- |
| 10 | 5.11 g example 1 | 9.13 g example 9 | 0.75 g |
| 11 | 12.77 g example 2 | 1.48 g example 9 | 0.75 g |
| 12 | 8.84 g example 6 | 5.40 g example 9 | 0.75 g |
| 13 | 6.26 g example 4 | 7.98 g example 9 | 0.75 g |
| 14 | 6.10 g example 7 | 8.15 g example 9 | 0.75 g |

| | 5 min 60° C. and 2 × 5 m/min UV | | 30 min 120° C. | |
| --- | --- | --- | --- | --- |
| Example | 200 double acetone strokes | Pendulum hardness | 200 double acetone strokes | Pendulum hardness |
| 10 | 5 | 109 | 0 | 174 |
| 11 | 0 | 158 | 0 | 162 |
| 12 | 3 | 70 | 2 | 100 |
| 13 | 3 | 126 | 0 | 181 |
| 14 | 0 | 128 | 0 | 177 |

| Example | Catalyst | Polyol | UV initiator |
| --- | --- | --- | --- |
| 15 | 4.57 g example 1 | 9.67 g Desmophen 870 A | 0.75 g Irgacure 184 |
| 16 | 4.97 g example 1 | 7.36 g Desmophen 870 A<br>1.93 g pentaerythritol triacrylate | 0.75 g Irgacure 184 |
| 17 | 4.77 g example 1 | 7.06 g Desmophen 870 A<br>2.43 g Laromer PE 44F | 0.75 g Irgacure 184 |
| 18 | 7.23 g example 1 | 7.02 g Desmophen VP LS 2089 | 0.75 g Irgacure 184 |
| 19 | 6.89 g example 1 | 4.68 g Desmophen VP LS 2089<br>2.67 pentaerythritol triacrylate | 0.75 g Irgacure 184 |

| Example | 5 min 60° C. and 2 × 5 m/min UV | | 30 min 120° C. | |
|---|---|---|---|---|
| | 200 double acetone strokes | Pendulum hardness | 200 double acetone strokes | Pendulum hardness |
| 15 | 5 | 26 | 5 | 158 |
| 16 | 5 | 56 | 0− | 170 |
| 17 | 5 | 27 | 0 | 176 |
| 18 | 3 | 57 | 0 | 184 |
| 19 | 0 | 119 | 0 | 194 |

Example 20

125.85 g Baymicron Oxa WM 06 (commercial product from Bayer AG), 97.55 g Demodur N3600 and 0.3 g 2,6-di-tert.-butyl-4-methyl phenol are placed in a three-neck flask with reflux condenser and stirrer at 50° C. and 0.3 g triethylamine, 75.40 g 2-hydroxyethyl acrylate and 0.3 g 2,6-di-tert.-butyl-4-methyl phenol are added dropwise within 20 minutes. The reaction mixture is stirred for approximately 3 h at 50° C., first under normal pressure and then, as soon as the evolution of gas reduces (approximately 2 h), under vacuum (approximately 25 mbar) until no more gas is evolved. 0.1 g 2,6-di-tert.-butyl-4-methyl phenol are then added and dissolved at 50° C. for 30 minutes. Saturation with air (4 l/h) then follows for 20 minutes. A product is obtained with a viscosity of 3900 mPas/23° C. NCO content 11.3%

Example 21

810.76 g Baymicron Oxa WM 06 (commercial product from Bayer AG), 11.72 g 1,2-ethanediol and 1.5 g triethylamine are placed in a three-neck flask with reflux condenser and stirrer at 50° C. and stirred for 1 h at 50° C. 673.02 g 2-hydroxyethyl acrylate and 3.0 g 2,6-di-tert.-butyl-4-methyl phenol are then added dropwise within 60 minutes. The reaction mixture is stirred at 50° C. for approximately 3 h, first under normal pressure and then, as soon as the evolution of gas reduces (approximately 2 h), under vacuum (approximately 25 mbar) until no more gas is evolved. Saturation then follows with air (4 l/h) for 20 minutes. Stirring is then continued at 60° C. until the NCO content is below 0.1%. A product is obtained with a viscosity of 31500 mPas/23° C. NCO content 0.0%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a polyisocyanate or a polyisocyanate secondary product containing at least one allophanate group, which carries at least one acrylate, methacrylate or vinyl ether double bond on the oxygen atom of the allophanate group, said oxygen atom being bound by two single bonds, comprising the step of reacting a polyisocyanate or a polyisocyanate secondary product containing at least one oxadiazinetrione group (formula 1)

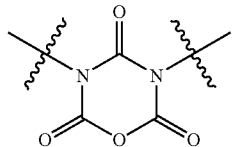

Formula 1 with an alcohol containing an acrylate, methacrylate or vinyl ether double bond at temperatures of from −20 to 100° C.

2. The process according to claim 1, wherein the reaction takes place in the presence of a basic catalyst.

3. The process according to claim 2, wherein the catalyst has a pKa>7.5.

4. The process according to claim 2, wherein the catalyst contains an amine.

5. The process according to claim 1, wherein the reaction is performed in the presence of at least one stabiliser.

6. The process according to claim 1, wherein the reaction is performed in the presence of 2,6-di-tert.-butyl-4-methyl phenol.

7. The process according to claim 1, wherein the polyisocyanate containing an oxadiazinetrione group is produced from 1,6-hexamethylene diisocyanate.

8. The process according to claim 1, wherein the polyisocyanate carries free isocyanate groups or capped isocyanate groups.

9. The process according to claim 1, wherein the reaction is performed in the presence of a further polyisocyanate or a polyisocyanate secondary product having 0.1 to 10 wt. % uretdione groups.

10. The process according to claim 1, characterised in that a polyfunctional alcohol is additionally used.

11. A polyisocyanate produced by the process according to claim 1, wherein the polyisocyanate comprises 2-35 wt. % allophanate groups, 0.1-5 wt. % uretdione groups, 0-5 wt. % oxadiazinetrione groups and 0.1-25 wt. % urethane groups.

12. The polyisocyanate according to claim 11 containing a stabiliser selected from the group consisting of phenols, HALS amines and phenothiazines.

13. The polyisocyanate according to claim 11 containing structural elements having formula 2

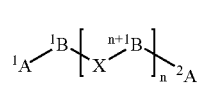

Formula 2 wherein, $^1A$ and $^2A$ represent radicals derived from isocyanate or isocyanate secondary products containing iminooxadiazinedione, isocyanurate, uretdione, urethane, allophanate, biuret, urea or oxadiazinetrione structures and carrying the aliphatic, cycloaliphatic or araliphatic radicals $^1B$ to $^{n+1}B$ in N position, where $^1B$ and $^{n+1}B$ are the same or different, X represents one of the structures X-1 and/or X-2,

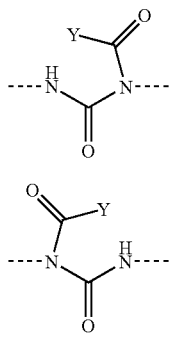

Structure X-1

Structure X-2

Y represents an organic radical —OR containing at least one activated double bond, where OR is formed by modeling the proton from the alcohol group and R is a vinyl ether, methacrylic or acrylic radical containing at least one double bond polymerizable by electromagnetic radiation;

n is a number greater than one and less than 20 and represents the mean of all molecules having formula 2 present in the compound according to the invention.

14. A composition selected from coating compositions, adhesive compositions, curing composition systems, and sealing compositions containing at least one polyisocyanate produced according to claim 11.

15. Substrates having a coating containing a reaction product of at least one polyisocyanate produced according to claim 11.

16. Substrates according to claim 15, wherein the substrate material comprises one or more of wood, metal, plastic and mineral substances.

* * * * *